United States Patent [19]

Yada

[11] Patent Number: 5,039,157
[45] Date of Patent: Aug. 13, 1991

[54] WINDSHIELD MOLDING

[75] Inventor: Yukihiko Yada, Nagoya, Japan

[73] Assignee: Tokai Kogyo Kabushiki Kaisha, Oobu, Japan

[21] Appl. No.: 626,552

[22] Filed: Dec. 12, 1990

[30] Foreign Application Priority Data

Dec. 14, 1989 [JP] Japan .............................. 1-143643[U]
Dec. 14, 1989 [JP] Japan .............................. 1-143644[U]

[51] Int. Cl.⁵ ............................................. B60J 10/02
[52] U.S. Cl. ..................................................... 296/93
[58] Field of Search ............................................ 296/93

[56] References Cited

U.S. PATENT DOCUMENTS 4,833,847 5/1989 Inayama et al. .................. 296/93 X
4,984,839 1/1991 Miyakawa et al. .................... 296/93

FOREIGN PATENT DOCUMENTS

2620661 3/1989 France .................................. 296/93

Primary Examiner—Margaret A. Focarino
Assistant Examiner—Gary C. Hoge
Attorney, Agent, or Firm—Oblon, Spivak, McClelland, Maier & Neustadt

[57] ABSTRACT

A windshield molding is used to install a windshield to a motor vehicle. Members composing the molding are bent or extended according to the upper and side edge portions of the windshield. The molding can assure a good sealing between the upper edge of the windshield and the vehicle body, and can conduct rain water through drain channels defined between the side edges of the windshield by means of a member disposed between the molding and the windshield. The members composing the molding can be made into one body.

3 Claims, 11 Drawing Sheets

FIG. 4(III)

FIG. 13(III)

FIG. 19(III)

WINDSHIELD MOLDING

BACKGROUND OF THE INVENTION

1. Field of the Invention

This invention relates to a molding for installing a windshield to a vehicle body.

2. Description of the Related Art

With an automobile, a molding is required to firmly install a windshield to a vehicle body panel and to completely seal a gap between the periphery of the windshield and the body panel.

In general, a windshield is wound a rubber or plastic strip around its periphery and is fixed to a body panel by means of an adhesive, a duplex adhesive tape or the like. Then a molding is installed in a gap between the body panel and the rubber or plastic strip so as to serve as a sealing member and a decorative member.

In the above-mentioned structure, drain channels are defined along side edges of the windshield. Japanese Utility Model Laid-Open Publication No. 32915/1988 exemplifies a dam, which is made by carving a side molding so as to guide rain water. Japanese Utility Model Laid-Open Publication No. 32916/1988 discloses a dam which is made on a side molding by means of the injection process.

In the former, a carved edge of the side molding sometimes suffers from burrs. It is necessary to take some measures to prevent the burrs. Besides, the side molding becomes narrower than the upper molding, which might impair external appearance of the whole molding. In the latter, a dam is added by means of the injection process after the molding is produced by the extrusion process. Therefore, part of synthetic resin composing the dam might leak to a decorative portion of the molding, thereby causing the boundary between the molding and the dam to be unclear, and damaging the decorative portion of the molding. In addition, there is an inconvenience that the part made by the extrusion molding and that made by the injection molding somewhat differ from each other in the appearance.

SUMMARY OF THE INVENTION

It is an object of the invention to provide a windshield molding which is simple to manufacture and easy to install, can define a drain channel along a gap between a vehicle body and a windshield, and can function both as a sealing member and a decoration member.

According to the invention there is provided a windshield molding, which comprises a base, a decorative trim portion disposed on the upper part of said base so as to cover a gap between a windshield and an automobile body panel, a base plate, and a connecting member. The base plate is made by bending a thin lower half of said base at central portion and includes legs projecting in the lengthwise direction. It has a notch at a portion corresponding to the vicinity of an upper end portion of a side edge of a windshield. The base plate is bent 90 degrees at a portion corresponding to the top edge and corner of the windshield so as to sandwich the windshield together with said decorative trim portion. In addition the base plate is bent 180 degrees at a portion corresponding to the side edge of the windshield so as to sandwich the windshield between said legs. The connecting member is disposed at a position corresponding to said notch between said base and said decorative trim portion.

In the second aspect of the invention, a windshield molding comprises a base, a decorative trim portion disposed on the upper part of said base so as to cover a gap between a windshield and a vehicle body panel, a projection piece disposed on the underside of said decorative trim portion on a side corresponding to the windshield, a base plate, and a connecting member. The base plate is made by bending the thin lower half of said base at central portion and includes a projection piece extending in the lengthwise direction, said base plate having a notch at a portion corresponding to the vicinity of an upper end portion of the side edge of the windshield. The base plate is bent 180 degrees at a portion corresponding to the top edge and corner of the windshield so as to sandwich the windshield between said decorative trim portion and said projection piece. In addition the base plate is bent 90 degrees at a portion corresponding to the side edge of the windshield so as to sandwich the windshield together with said projection piece. The connecting member is disposed at a position corresponding to said notch between said base and said decorative trim portion.

According to the third aspect of the invention, a windshield molding comprises a base, a decorative trim portion disposed on the upper part of said base so as to cover a gap between a windshield and an automobile body panel, a concave portion disposed on the underside of said decorative trim portion on a side corresponding to the windshield, a base plate, and a fitting wall having a projection engaged with said concave portion on the underside of said decorative trim portion. The base plate is made by bending the thin lower half of said base at central portion and includes a projection piece extending in the lengthwise direction. The base plate has a notch at a portion corresponding to the vicinity of an upper end portion of the windshield. The base plate is bent 180 degrees at a portion corresponding to the top edge and corner of the windshield so as to sandwich the windshield between said projection piece and said decorative trim portion. In addition, the base plate is bent 90 degrees at a portion corresponding to the side edge of the windshield so as to sandwich the windshield together with said fitting wall.

According to the invention, the decorative trim portion of the molding sealing engages against the windshield and the vehicle body from the top edge to the corner, and defines a water conducting drain channel on the side edge of the windshield from the corner to the lower end.

The molding is of synthetic resin, and is easily manufactured into one body. Since no additional after-treatment is made to the molding, the molding is free from damages or unfavorable appearance. A base plate of the same shape is used as a member for sandwiching the windshield or as a member for supporting legs of the molding, so that sealing engagement can be assured between the periphery of the windshield and the vehicle body panel. In addition, the drain channel can conduct water or other liquids without dispersing them.

BRIEF DESCRIPTION OF THE DRAWINGS

FIGS. 4(I), 4(II) and 4 (III) are a top plan view, a front elevational view and a side elevational view of the connecting portion;

FIGS. 13(I) to 13(IV) are a top plan view, a front elevational view and side perspective views of the sandwiching member;

FIGS. 19(I) to 19(II) are a top plan view, a front elevational view, and a side elevational view of the fitting wall;

DETAILED DESCRIPTION

Figure 1:
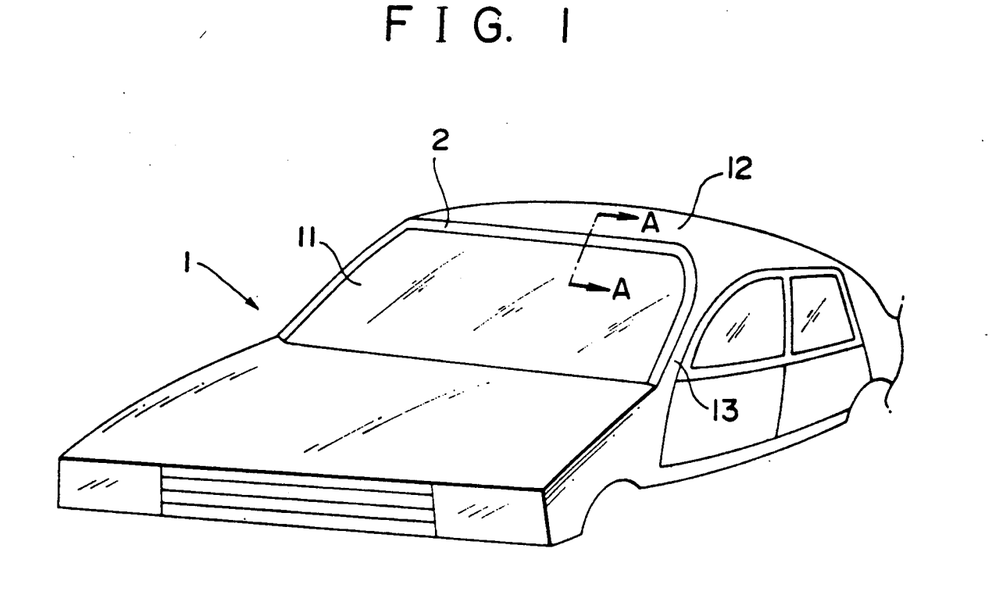
FIG. 1 is a perspective view of a vehicle body having a windshield molding according to the invention.

Referring to FIGS. 1 to 7, a first embodiment of the invention will be described, in which a molding is applied to a vehicle windshield. FIG. 1 shows that a windshield 11 is attached, by means of a molding 2, to a roof panel 12 and a front pillar 13 of the vehicle body.

Figure 2:
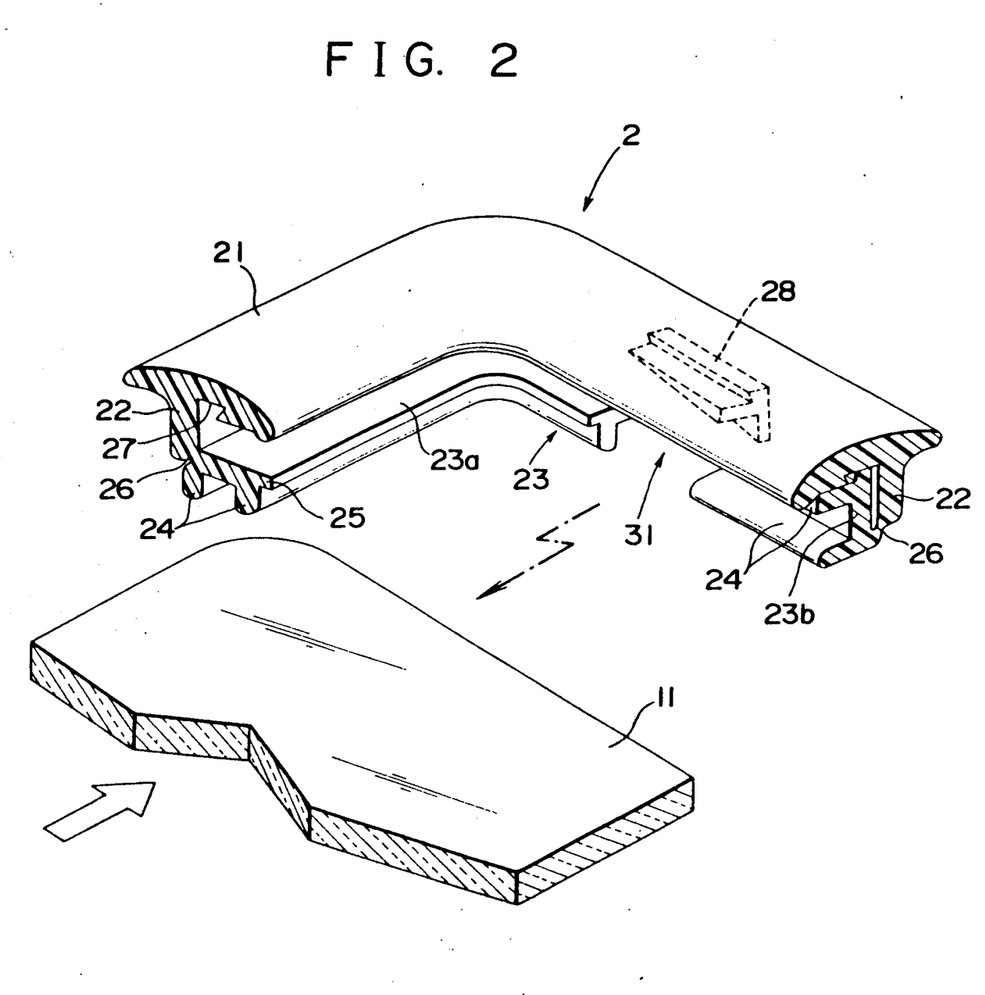
FIG. 2 shows the structure to mount a windshield to the corner portion of a molding according to a first embodiment of the invention.

FIG. 2 shows a structure to install the corner portion of the windshield to the molding. The molding is a strip whose cross section is substantially T-shaped, and is attached along the periphery of the windshield 11. The molding 2 is made of an elastic material such as synthetic resin and rubber, and is manufactured by the extrusion process.

The molding 2 comprises a lip-shaped decorative trim portion 21 at its upper horizontal part, and a base 22 at the lower vertical part. The decorative trim portion 21 covers a gap between the windshield and body panels 12 and 13. The base 22 is fitted into a gap between the body 1 and the windshield 11. The decorative trim portion 21 is provided with a concave portion 27 at its inner underside near the upper end of the base 22. The base 22 is thinned at its substantially central portion 26, at which the base 22 is bent inwardly so as to form a base plate 23. The base plate 23 has legs 24 projected at its both side edges in the lengthwise direction, and has a brim 25 along the side edge. The base plate 23 is divided into a first base plate portion 23a for receiving the top edge, corner and upper side edge of the windshield 11, and a second base plate portion 23b for receiving the side edge of the windshield 11. The base plate portion 23b is doubled up (bent 180 degrees) at the central portion 26. There is a notch 31 between the base plate portions 23a and 23b. A connecting member 28 is disposed on the inner wall of the base 22 where the notch 31 is made.

Figure 3:
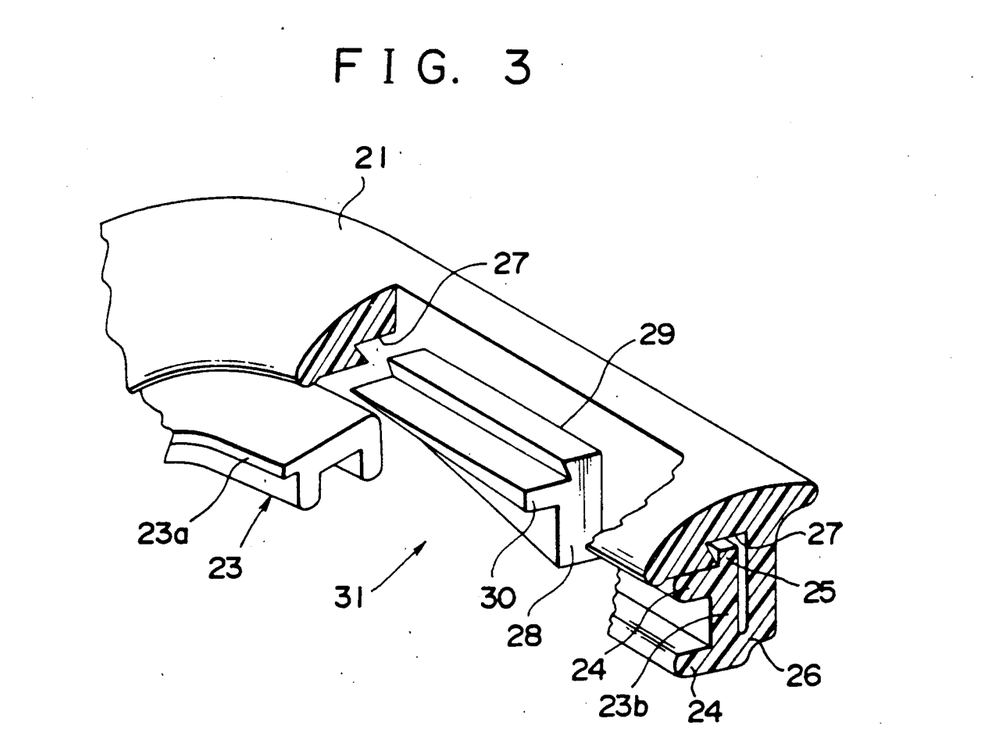
FIG. 3 is a cutaway view of a part of the molding to which a connecting member is attached.
Figure 4:
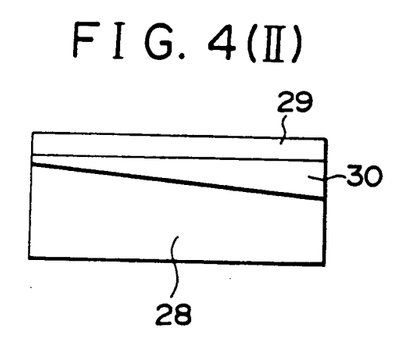
Figure 4I:
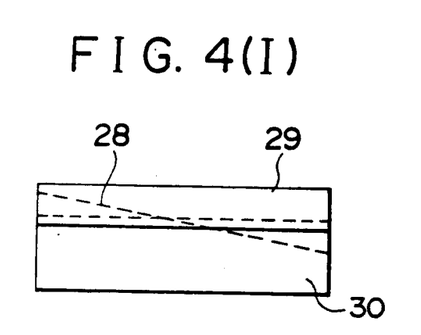

As shown in FIGS. 3 and 4(I) to 4(III), the connecting member 28 is a plate, which is as long as the notch 31 between the base plate portions 23a and 23b, and is as thick as the base plate 23. The connecting member 28 has an upper projection 29 in the lengthwise direction so as to engage with the concave portion 27 of the molding 2. The connecting member 28 is attached to the molding 2 by engaging the upper projection 29 with the concave portion 27 from the underside. The connecting member 28 also has a wedge-shaped connecting plate 30 along the underside of the upper projection 29. The connecting plate 30 projects toward the windshield 11, and is acute at its one end and at the other end is as thick as the leg 24. The lower part of the connecting member 28 is tapered toward the acute end of the connecting plate 30.

The molding 2 is fitted around the periphery of the windshield 11. The first base plate portion 23a is made by bending the base 22 by 90 degrees at the central portion 26, so that a U-shaped space is formed by the decorative trim portion 21, base 22 and base plate portion 23a. The top edge of the windshield 11 is fitted into the U-shaped space. The second base plate portion 23b is folded up from the central portion 26 so as to erect, thereby engaging the projection 25 of the base plate portion 23b with the concave portion 27 of the molding 2. The side edge of the windshield 11 is sandwiched by the legs 24 of the base plate portion 23b. The connecting member 28 comes into close contact with the upper and side edges of the windshield 11 at the corner on the inner side of the decorative trim portion 21 of the molding 2.

Then the windshield 11 fitted into the molding 2 is installed on a vehicle body.

First the decorative trim portion 21 of the molding 2 is placed in close contact with an edge of the roof panel 12.

Figure 5:
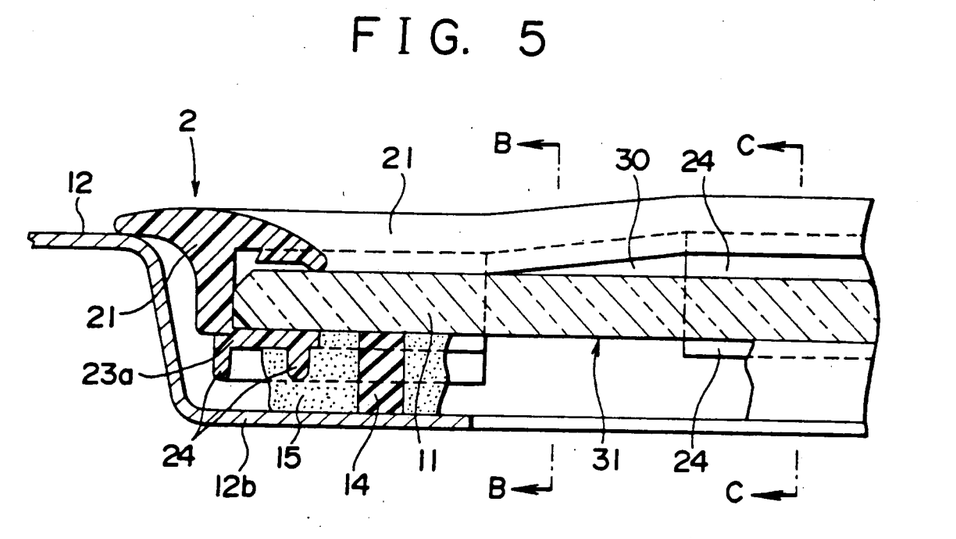
FIG. 5 is a cross sectional view of the molding taken in the direction of the arrows along the line of FIG. 1.

FIG. 5 is a cross sectional view showing the structure to install the upper edge of the windshield 11 on the body (taken in the direction of the arrows A—A in FIG. 1). The underside of the windshield 11 and the underside of the legs 24 of the molding 2 are fixed to a flange 12b of the roof panel 12 by an adhesive 15. The edge of the windshield 11 is sandwiched by the inner side edge of the decorative trim portion 21 and the first base plate portion 23a, while the outer edge of the decorative trim portion 21 is contacted with the edge of the roof panel 12. A dam rubber 14 helps to position the windshield 11 and also serves to base the windshield 11 until the adhesive 15 hardens completely.

Figure 6:
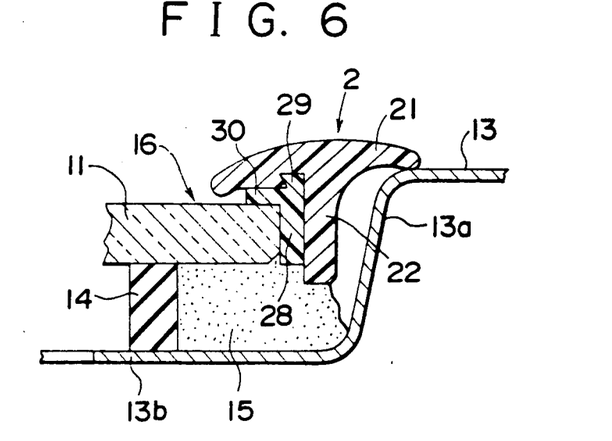
FIG. 6 is a cross sectional view taken in the direction of the arrows B—B of FIG. 5.

FIG. 6 is a cross sectional view showing the windshield fitted into the corner portion of the molding (taken in the direction of the arrows B—B in FIG. 5). The windshield 11 and the molding 2 are fixed to the flange 13b of the front pillar 13 by means of the adhesive 15 and the dam rubber 14.

At the corner of the molding 2, the base 22 lacks the base plate 23. The connecting member 28 is disposed under the decorative trim portion 21, so that the connecting member 28 exists between the lower side of the decorative trim portion 21, base 22 and windshield 11. The outer edge of the decorative trim portion 21 is in close contact with the front pillar 13, and the inner edge of the decorative trim portion 21 is on the connecting plate 30 of the connecting member 28. As described above, the connecting member 28 exists between the edge of the windshield 11 and the base 22. The space between the base 22 and the edge of the windshield 11 becomes larger according to the thickness of the connecting member 28, becoming as large as the thickness of the base plate 23 at the end of the connecting member 28.

In addition, the connecting plate 30 exists on the upper surface of the windshield 11 and under the decorative trim portion 21.

The inner edge of the decorative trim portion 21 is kept apart from the upper surface of the windshield 11 so as to form a gap 16 which is as wide as the thickness of the connecting plate 30. Since the connecting plate 30 is made gradually thicker, the gap 16 is also made gradually larger from the corner to the lower part of the side edge.

Figure 7:
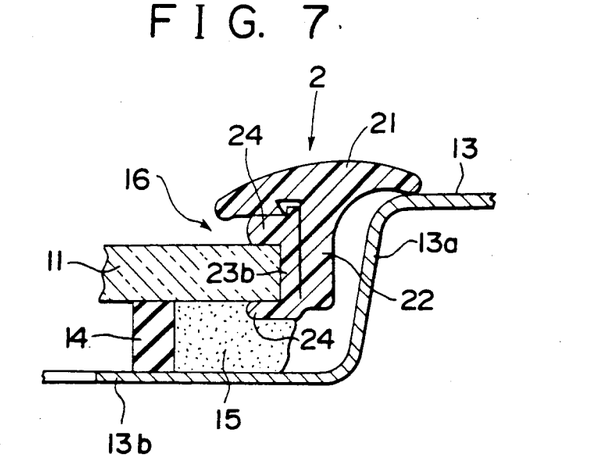
FIG. 7 is a cross sectional view taken in the direction of the arrows C—C of FIG. 5.

FIG. 7 is a cross sectional view taken in the direction of the arrows C—C of FIG. 5 (at the side edge of the windshield 11).

The windshield 11 and the molding 2 are attached to the flange 13b of the front pillar 13 by means the adhesive 15 and the dam rubber 14. The edge of the windshield 11 is sandwiched between the legs 24 of the base plate 23. The outer edge of the decorative trim portion 21 of the molding 2 is in close contact with the front pillar 13, while the inner edge of the decorative trim portion 21 is kept apart from the windshield 11 by the leg 24 which is on the windshield 11, so that a gap 16 which is as wide as the thickness of the leg 24 is formed between the inner edge of the decorative trim portion 21 and the windshield 11.

With the foregoing embodiment, both the decorative trim portion 21 and the base plate 23 serve to sandwich the top edge of the windshield 11, and the decorative trim portion 21 seals the vehicle body and the top edge of the windshield 21. At the side edge portion of the moulding 2, the base plate 23 is doubled up (bent 180 degrees) at the central portion 26, so that the legs 24 can sandwich the windshield 11. As a result, a gap 16 serving as a drain channel can be defined along the side edge of the windshield. The gap 16 is made gradually larger by the connecting member 28 from the corner toward the side edge, thereby conducting rain water smoothly and assuring good sealing.

Figure 8:
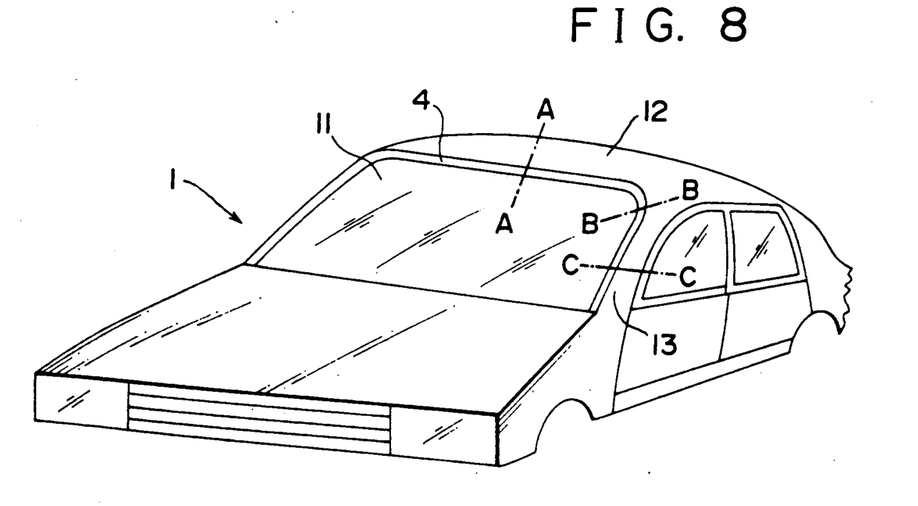
FIG. 8 is a perspective view of the vehicle body.
Figure 9:
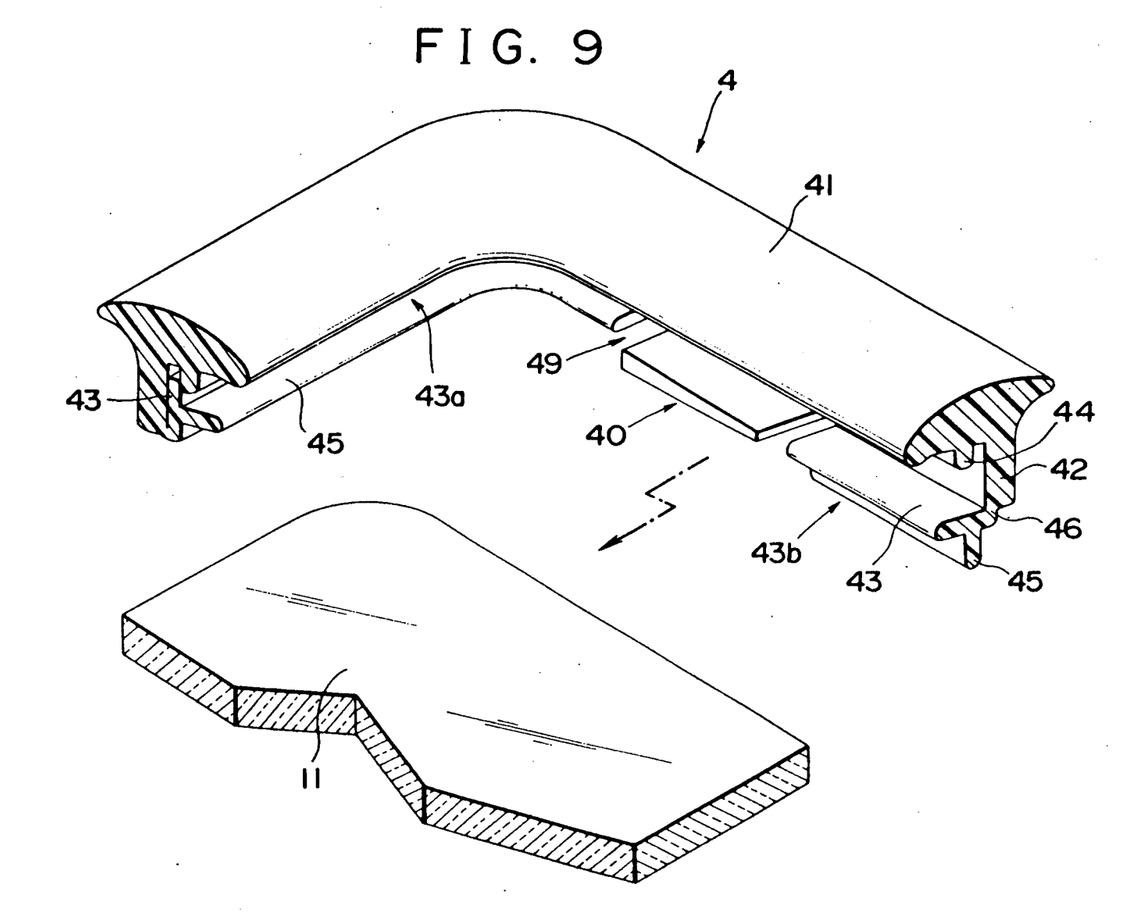
FIG. 9 shows the structure to install a windshield to the corner portion of a windshield.
Figure 10:
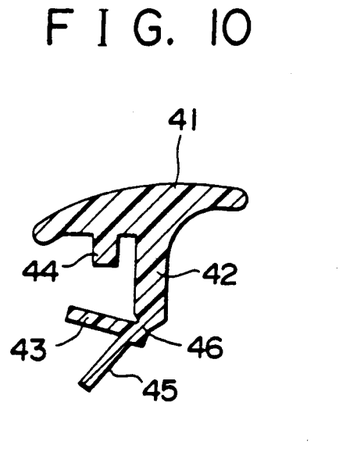
FIG. 10 is a cross sectional view of a molding to which a base plate is attached.
Figure 11:
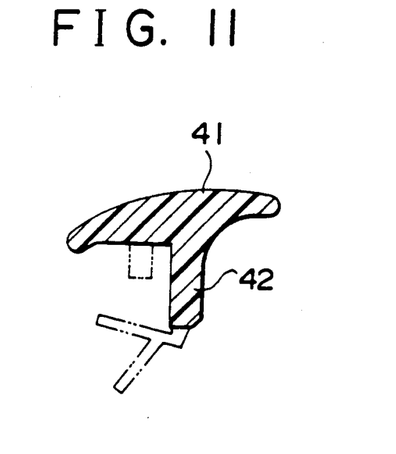
FIG. 11 is a cross sectional view of a molding without a base plate.

In an embodiment shown in FIGS. 8 and 9, a projection 44 is made on the underside of the decorative trim portion 41 where the windshield is inserted. The projection 44 is provided in the lengthwise direction of the decorative trim portion 41 except the notch portion which is at the upper side end of and near the corner portion of the molding 2. The base 42 is thinned at its central portion 46, at which the base 42 is bent inwardly 90° so as to form the base plate 43. The base plate 43 has a projection 45 on its underside. (Refer to FIG. 10.) The base plate 43 has a first base plate portion 43a for receiving the top edge and corner edge of the windshield 11, and a second base plate portion 43b for receiving the side edge of the windshield 11. Both of these base plate portions 43a and 43b are separated by the notch 49 which is at the upper side end of and near the corner of the molding 2. There is no projection 44 on the decorative trim portion 41 at the position corresponding to the notch 40. Therefore, there is no projection 44, base plate 43 and projection 45 at the notch 49 as shown in FIG. 11. The connecting member 40 is disposed in the notch 49.

Figure 12:
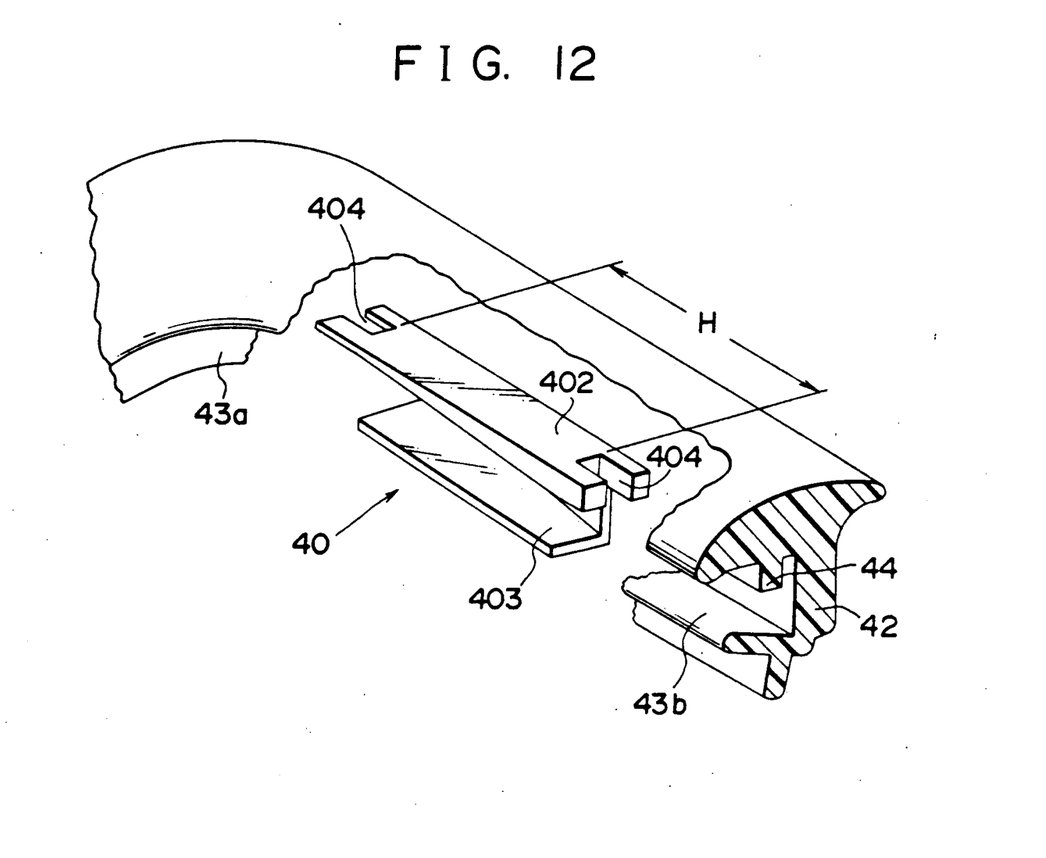
FIG. 12 is a cutaway view of a part of the molding at which a sandwiching member is disposed.
Figure 13:
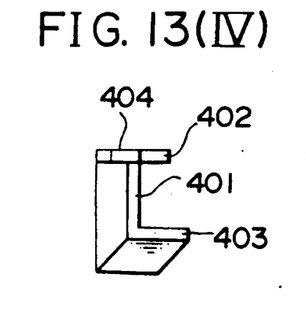
Figure 13I:
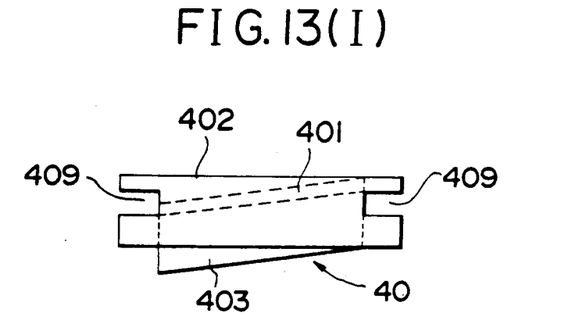

The connecting member 40 is structured as shown in FIGS. 12 and 13(I) to 13(IV) (which are a top plan view, a front elevational view, a right side perspective view, and a left side perspective view, respectively). The connecting member 40 comprises a base 401, an engaging plate 402 disposed on the base 401, and a sandwiching plate 403 at the lower part of the base 401. As a whole the connecting member 40 is a U-shaped member which is as high as the base 42 of the molding 2. The engaging plate 402 is thin at its one end and gradually thickens toward the other end in the lengthwise direction. The thick end of the engaging plate 402 is as thick as the projection 44 of the molding 2. The connecting member 40 has notches 404 at its both ends so as to engage with the projection 44 of the molding 2. The distance H between the two notches 404 is the same as the length of the notch 49 of the molding 2 where the projection 44 is not disposed.

The length of the base 401 of the connecting member 40 is nearly the same as the length H between the two notches 404 on the engaging plate 402. The base 401 is high at the thick end of the engaging plate 402 and gradually lowers toward the thin end of the engaging plate 402. In other words, the lower tilt of the base 401 is the same as the tilt of the engaging plate 402.

The sandwiching plate 403 projects from the lower part of the base 401 toward the windshield, and forms a U-shaped cross-section together with the engaging plate 402 and the base 401. The connecting member 40 is inserted into the notch 49 of the molding 2 so that the thin end of the sandwiching plate 40 is disposed near the corner of the molding 2, and that the thick notch 404 of the engaging plate 402 engages with the projection 44 of the molding 2.

Then the molding 2 structured as described above will be installed along the side edge of the windshield 11.

The first base plate portion 43a for receiving the top edge and corner edge of the windshield (FIG. 14) is doubled up (bent 180 degrees) toward the base 42 at the portion 46 and is engaged with the projection 44. Under this state, the projection 45 of the base plate portion 43a is in parallel with the under side of the decorative trim portion 41 with a space formed therebetween. The windshield 11 is inserted into the space until the side edge of the windshield 11 comes into contact with the projection 44, so that the windshield 11 is sandwiched by the decorative trim portion 41 and the projection 45.

To receive the side edge of the windshield 11 (FIG. 16), the connecting plate portion 43b is bent 90 degrees at the portion 46 of the base 42, so that a U-shaped space is formed between the underside of the decorative trim portion 41 (where the projection 44 is provided), the base 42 and the connecting plate portion 43b.

At the notch 49 near the corner of the molding (FIG. 15), the connecting member 40 receives the side edge of the windshield 11.

The windshield 11 having the molding 2 fitted along the side edge will be installed on the vehicle body. The decorative trim portion 41 sealingly engages against the roof panel 12 and the front pillar 13.

Figure 14:
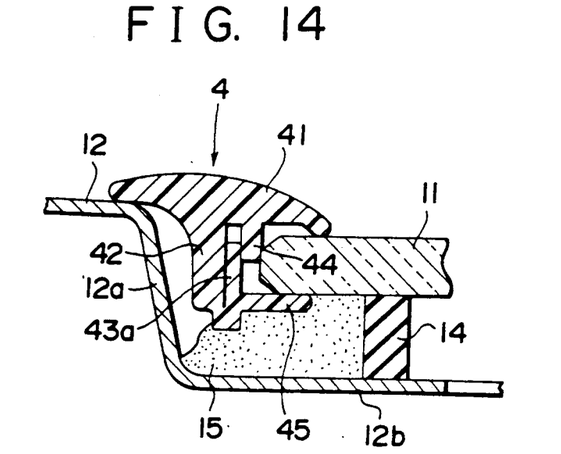
FIG. 14 is a cross sectional view taken in the direction of the arrows A—A of FIG. 8.

FIG. 14 is a cross sectional view of the structure to install the upper edge of the windshield 11 (taken in the direction of the arrows A—A of FIG. 8).

The first connecting plate portion 43a is doubled up toward the base 42 at the portion 46 so as to erect.

The undersides of the windshield 11 and the projection 45 of the molding 2 are fixed to the flange 12b of the roof panel 12 by means of the adhesive 15. The inner edge of the decorative trim portion 41 and the base plate portion 23a sandwich the edge of the windshield 11, while the outer edge of the decorative trim portion 41 is in close contact with the edge of the roof panel 12. The dam rubber 14 helps to position the windshield 11 and also serves to hold the molding 2 and the windshield 11 until the adhesive 15 hardens.

Figure 15:
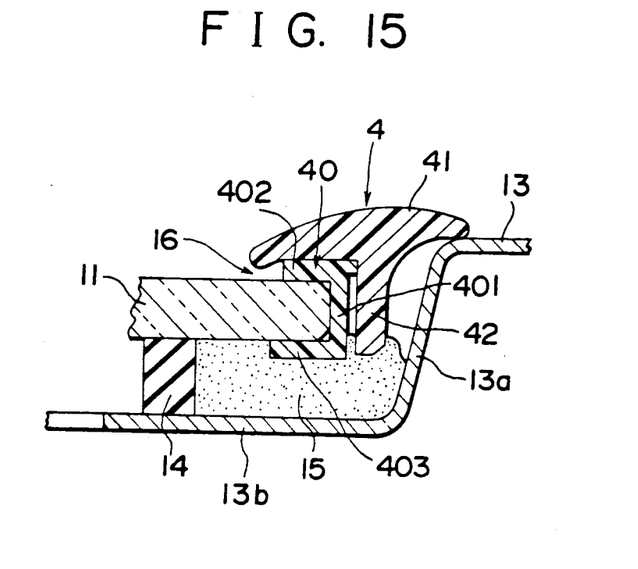
FIG. 15 is a cross sectional view taken in the direction of the arrows B—B of FIG. 8.

FIG. 15 is a cross sectional view of the structure to install the corner of the windshield to the body (taken in the direction of the arrows B—B of FIG. 8).

The undersides of the windshield 11, base 42 of the molding 2, and the connecting member 40 are fixed to the flange 13b of the front pillar 13 by means of the adhesive 15 and dam rubber 14.

At the upper side end and near the corner, the molding 2 has the notch 49 where there are neither the base plate 43 nor the projection 44 on the underside of the decorative trim portion 41. The connecting plate 40 is disposed in the notch 49 under the decorative trim portion 41. The outer edge of the decorative trim portion 41 is in close contact with the front pillar 13, while the inner edge of the decorative trim portion 41 is placed on the engaging plate 42 of the connecting plate 40. A gap 16 is formed between the windshield 11 and the decorative trim portion 41 with the connecting plate 40 disposed therebetween. The gap 16 is gradually enlarged toward the lower side edge according to the thickness of the engaging plate 42 of the connecting member 40.

Since the base 41 of the connecting plate 40 exists between the edge of the windshield 11 and the base 42 of the molding 2, the windshield 11 becomes closer to the base 42 according to the base 41 of the connecting member 40, and is closely contacted to the base 42 at the end of the connecting member 40.

Figure 16:
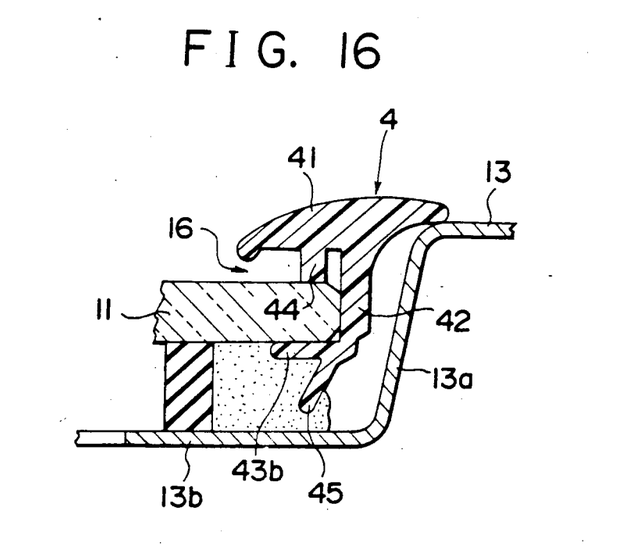
FIG. 16 is a cross sectional view taken in the direction of the arrows C—C of FIG. 8.

FIG. 16 is a cross sectional view taken in the direction of the arrows C—C of FIG. 8 (of the side edge of the windshield).

The windshield 11, the second connecting plate portion 43b of the molding 2 and the projection 45 are fixed to the flange 13b of the front pillar 13 by means of the adhesive 15 and the dam rubber 14. The edge of the windshield 11 is sandwiched between the connecting plate portion 43b and the projection 44 on the underside of the decorative trim portion 41. The outer edge of the decorative trim portion 41 of the molding 2 is closely contacted with the front pillar 13, while the inner edge of the decorative trip portion 41 is kept apart from the windshield 11 with the projection 44 of the decorative trip portion 41 interposed therebetween, thereby forming a gap 16 which is as wide as the thickness of the projection 44.

With the above-mentioned embodiment, to receive the top edge of the windshield 11, the base plate portion 43a is doubled up at the thin central portion 46. The upper edge of the windshield 11 is sandwiched by the decorative portion 41 and the projections 44 and 45. The decorative trim portion 41 and the projections 44 and 45 seal the cavity between the vehicle body and the windshield. To receive the side edge of the windshield, the base 42 is bent by 90 degrees at the thin portion 46.

The base plate portion 43b and the projection 44 sandwich the windshield, and the decorative trim portion 41 seals the cavity between the vehicle body and the windshield. A gap 16 is made along the side edge of the windshield so as to serve as a drain channel. The gap 16 is gradually enlarged from the corner to the lower end of the windshield according to the thickness of the connecting member 40 disposed between the windshield and the lip portion of the decorative trim portion 41, thereby conducting water smoothly.

A further embodiment of the molding according to this invention will be described with reference to FIG. 17 to FIG. 22.

Figure 17:
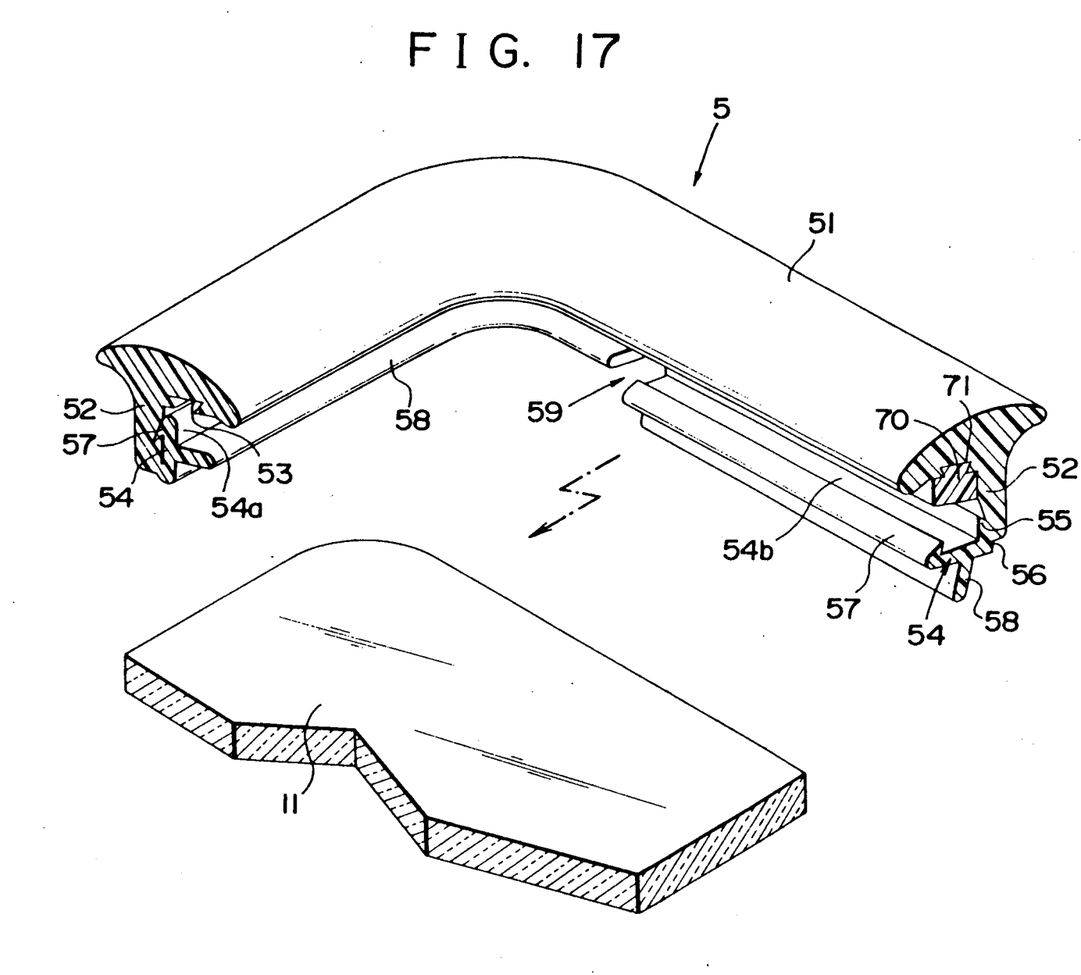
FIG. 17 shows the structure to install a molding to the corner portion of a windshield in a further embodiment of the invention.

A molding 5 is a strip having a substantially T-shaped cross section. The molding 5 comprises, at its lower vertical part, a base 52 which is fitted into a gap between the body and the windshield 11, and a decorative trim portion 51 at its upper horizontal part. The decorative trim portion 51 covers a cavity between the body panels 12 and 13, and the windshield 11. A concave portion 53 is provided on the inner underside of the decorative trim portion 51 where the windshield is inserted.

The lower half of the base 52 is thinned, and is bent at a portion 56 so as to form a base plate 54. An engaging projection 55 is provided at the lower part of the base 52 where the windshield is received. The base plate 54 is not so wide as the height of the base 22, and has a claw 57, along its one edge, for engagement with the engaging projection 55 of the base 52. In addition, a projection piece 58 is provided on the underside of the base plate 54.

Near the corner portion of the molding 5, the base plate 54 is cut to form a notch 59. The base plate 54 comprises a first base plate portion 54a for receiving the upper edge, corner and side edge of the windshield 11, and a second base plate portion 54b for receiving the side edge of the windshield 11. These base plate portions 54a and 54b are separated by the notch 54.

Figure 18:
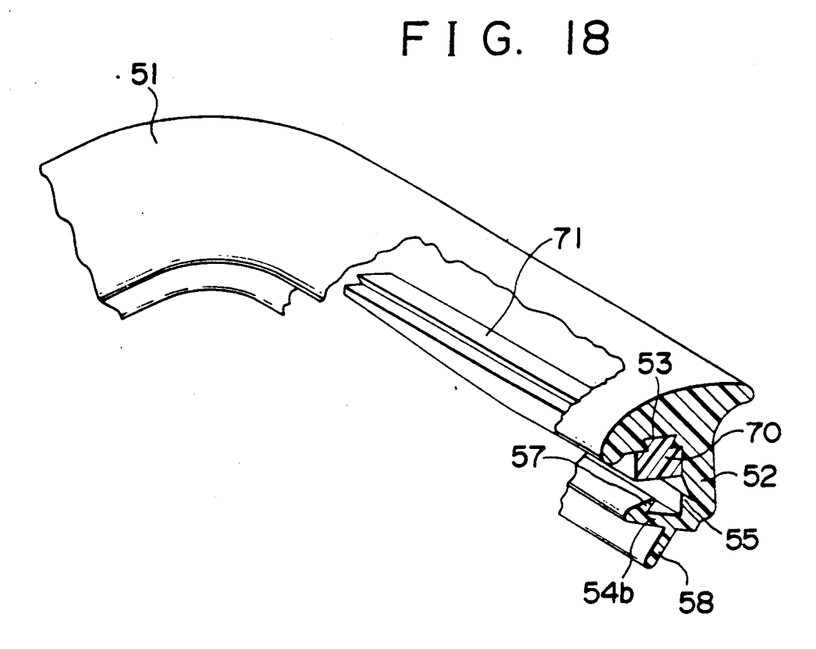
FIG. 18 is a cutaway view of a part of the molding to which a fitting wall is mounted.
Figure 19:
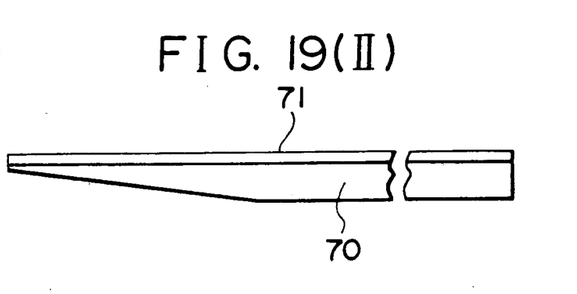
Figure 19I:
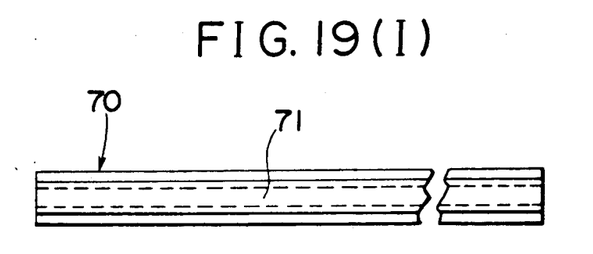

A beam-shaped member comprising a fitting wall 70 and a fitting projection 71 is disposed in the notch 59. The fitting wall 70 engages with the concave portion 53 on the underside of the decorative trim portion 51. FIGS. 18 and 19(I) to 19(II) illustrate the structure of the fitting wall 70 and the fitting projection 71. The fitting projection 71 is fitted into the concave portion 53 on the underside of the decorative trim portion 51 of the molding. The fitting projection 71 and the fitting wall 70 are as long as the second base plate portion 54b. The fitting wall 70 is thin at its one end and gradually thickens to the other end. When the thick end of the fitting projection 71 is engaged with the concave portion 53 of the molding 5, the thin end of the fitting wall 70 is disposed on the side of the notch 59.

The molding 5 structured as described above will be fitted around the side edge of the windshield 11.

To receive the corner between the upper and side edges of the windshield 11, the first base plate portion 54a is doubled up (bent 180 degrees) at the thin portion 56 toward the base 52. The engaging claw 57 of the first base plate portion 54a is engaged with the projection 55 of the base 52. Under this state, the projection piece 58 of the first base plate portion 54a is in parallel with the underside of the decorative trim portion with a gap formed therebetween. The windshield 11 is inserted into the gap until the side edge of the windshield 11 comes into contact with the base plate portion 54a, so that the side edge of the windshield will be sandwiched by the decorative trim portion 51 and the projection piece 58.

To receive the side edge of the windshield 11, the second base plate portion 54b is bent 90 degrees at the thin portion 56. Then the side edge of the windshield 11 is sandwiched by the fitting wall 70 and the second base plate portion 54b.

Then the windshield having the molding 5 attached along its side edge will be installed to the vehicle body.

Figure 20:
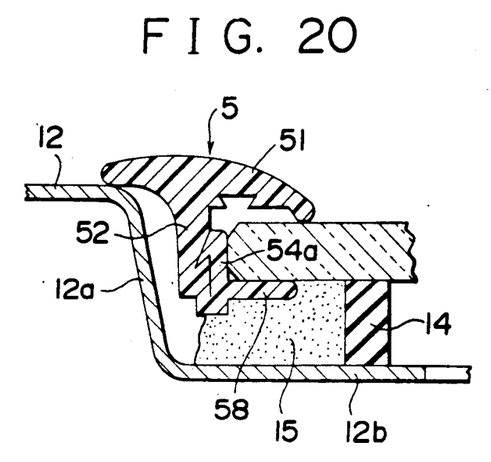
FIG. 20 is a cross sectional view taken in the direction of the arrows A—A of FIG. 8.

FIG. 20 is a cross sectional view of the structure to install the windshield 11 to the vehicle body (taken in the direction of the arrows A—A in FIG. 8).

The first base plate portion 54a is doubled up toward the base 52 at the thin portion 56, so that the engaging claw 57 is engaged with the projection 55 on the base 52.

The undersides of the windshield 11 and the projection 58 of the molding 5 are fixed to the flange 12b of the roof panel 12 by means of the adhesive 15. The inner edge of the decorative trim portion 51 and the projection piece 58 of the base plate portion 54a sandwich the side edge of the windshield 11, while the outer edge of the decorative trim portion 51 comes into close contact with the edge of the roof panel 12. The dam rubber 14 helps to position the windshield 11 and serves to hold the windshield 11 until the adhesive 15 hardens.

Figure 21:
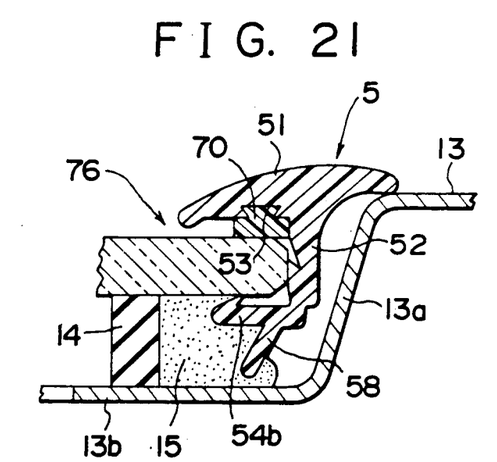
FIG. 21 is a cross sectional view taken in the direction of the arrows B—B of FIG. 8.

FIG. 21 is a cross sectional view of the structure to install the corner portion of the windshield 11 to the vehicle body (taken in the direction of the arrows A—A in FIG. 8). The undersides of the windshield 11, base plate portion 54b and projection piece 58 are fixed to the flange 13b of the front pillar 13 by means of the adhesive 15 and the dam rubber 15.

At the corner of the molding 5, the fitting wall 70 is disposed on the underside of the decorative trim portion 51. The outer edge of the decorative trim portion 51 is in close contact with the front pillar 13, while the inner edge portion of the decorative trim portion 51 is on the fitting wall 70. A gap 76 is formed between the upper surface of the windshield 11 and the inner edge of the decorative trim portion 51 according to the thickness of the fitting wall 70. The gap 76 gradually becomes larger from the corner to the side portion of the molding 5 as the fitting wall 70 becomes thicker.

Figure 22:
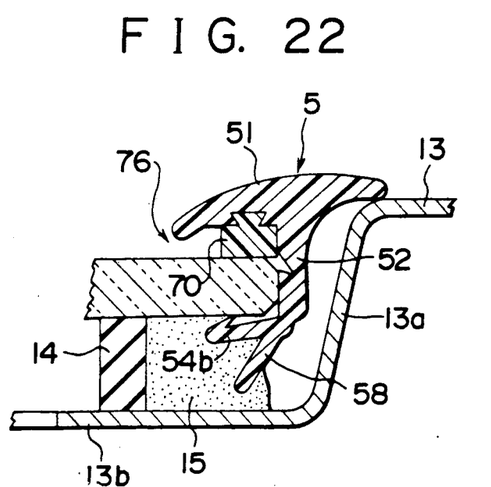
FIG. 22 is a cross sectional view taken in the direction of the arrows C—C of FIG. 8.

FIG. 22 is a cross sectional view of the molding 5 at the side edge of the windshield 11 (taken in the direction of the arrows C—C of FIG. 8).

The windshield 11, the second base plate portion 54b and the projection 58 of the molding 5 are fixed to the flange 13b of the front pillar 13 by means of the adhesive 15 and the dam rubber 14. The side edge of the windshield 11 is sandwiched between the base plate portion 54b and the fitting wall 70. The outer edge of the decorative trim portion 51 is in close contact with the front pillar 13, while the inner edge of the decorative trim portion 51 is disposed on the side edge of the windshield 11 with the fitting wall 70 fitted therebetween. As a result, the gap 76 is formed between the decorative trim portion 51 and the windshield according to the thickness of the fitting wall 70. The gap 76 gradually becomes larger from the corner to the side edge portion of the molding 5 as the fitting wall becomes thicker.

What is claimed is:

1. A windshield molding for a motor vehicle, comprising:
   (a) a base;
   (b) a decorative trim portion disposed on the upper part of said base so as to cover a gap between a windshield and an automobile body panel;
   (c) a base plate which is made by bending a thin lower half of said base at a central portion and includes legs projecting in the lengthwise direction, said base plate having a notch at a portion corresponding to the vicinity of an upper end portion of a side edge of a windshield, said base plate being bent 90 degrees at a portion corresponding to the top edge and corner of the windshield so as to sandwich the windshield together with said decorative trim portion, and said base plate being bent 180 degrees at a portion corresponding to the side edge of the windshield so as to sandwich the windshield between said legs; and
   (d) a connecting member disposed at a position corresponding to said notch between said base and said decorative trim portion.

2. A windshield molding for a motor vehicle, comprising:
   (a) a base;
   (b) a decorative trim portion disposed on the upper part of said base so as to cover a gap between a windshield and a vehicle body panel;
   (c) a projection piece disposed on the underside of said decorative trim portion on a side corresponding to the windshield;
   (d) a base plate which is made by bending a thin lower half of said base at central portion and includes a projection piece extending in the lengthwise direction, said base plate having a notch at a portion corresponding to the vicinity of an upper end portion of the side edge of the windshield, said base plate being bent 180 degrees at a portion corresponding to the top edge and corner of the windshield so as to sandwich the windshield between said decorative trim portion and said projection piece, and said base plate being bent 90 degrees at a portion corresponding to the side edge of the windshield so as to sandwich the windshield together with said projection piece; and
   (e) a connecting member disposed at a position corresponding to said notch between said base and said decorative trim portion.

3. A windshield molding for a motor vehicle, comprising:
   (a) a base;
   (b) a decorative trim portion disposed on the upper part of said base so as to cover a gap between a windshield and an automobile body panel;
   (c) a concave portion disposed on the underside of said decorative trim portion on a side corresponding to the windshield;
   (d) a fitting wall having a projection engaged with said concave portion on the underside of said decorative trim portion; and
   (e) a base plate which is made by bending a thin lower half of said base at central portion and includes a projection piece extending in the lengthwise direction, said base plate having a notch at a portion corresponding to the vicinity of a upper end portion of the side edge of the windshield, said base plate being bent 180 degrees at a portion corresponding to the top edge and corner of the windshield so as to sandwich the windshield between said projection piece and said decorative trim portion, and said base plate being bent 90 degrees at a portion corresponding to the side edge of the windshield so as to sandwich the windshield together with said fitting wall.

* * * * *